2,922,821
Patented Jan. 26, 1960

2,922,821

MERCAPTALS OF 3,3-DICHLORO-2-METHYLACROLEIN

Donald G. Kundiger and Gene F. Morris, Manhattan, Kans., assignors to The Dow Chemical Company, Midland, Mich., a corporation of Delaware No Drawing. Application October 6, 1958
Serial No. 765,294

3 Claims. (Cl. 260—609)

This invention is concerned with mercaptals having the structure

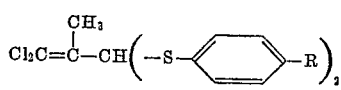

In this and succeeding formulae, R represents methyl or chlorine.

The new compounds are white solids soluble in common organic solvents such as benzene, acetone and ethanol and substantially insoluble in water. These compounds are useful as parasiticides and are adapted to be employed for the control of insects, aphids and microorganisms.

The above compounds may be prepared by mixing together 3,3-dichloro-2-methylacrolein having the structure

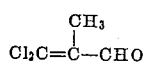

with an appropriate thiophenol having the structure

in the presence of an acidic catalyst to produce the desired mercaptal and water of reaction.

In the synthesis of the new compounds, 3,3-dichloro-2-methylacrolein, an appropriate thiophenol and catalyst are dissolved in or mixed with a reaction solvent. Suitable catalysts include anhydrous hydrogen chloride, zinc chloride and concentrated sulfuric acid. Suitable solvents include petroleum ether, benzene, toluene and xylene. Good results are obtained when about one molar proportion of the acrolein compound and about two molar proportions of the thiophenol are employed. The reaction is carried out in the temperature range of from 16° C. to 80° C. for a period of from 0.5 hour to 4 hours. After completion of the reaction, the arylmercaptal 3,3-dichloro-2-methylacrolein may be recovered in the conventional manner.

In the preferred method for carrying out the reaction, one molar proportion of 3,3-dichloro-2-methylacrolein and two molar proportions of the appropriate thiophenol are mixed together in an inert solvent and anhydrous hydrogen chloride bubbled therethrough. A reaction starts to take place immediately with evolution of heat. The mixture is then heated for a period of from one to three hours to complete the reaction and to obtain the desired product mercaptal of 3,3-dichloro-2-methylacrolein and water of reaction. The mixture is then cooled to precipitate the product. The latter is isolated by filtration and purified, if desired, by crystallization.

The following examples illustrate the invention but are not to be construed as limiting.

*Example 1.—3,3-dichloro-2-methylacrolein, di(p-tolyl) mercaptal*

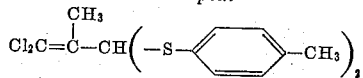

Anhydrous hydrogen chloride gas was bubbled through a mixture of 37 grams (0.25 mole) of 3,3-dichloro-2-methylacrolein, 62 grams (0.50 mole) of p-thiocresol and 200 milliliters of petroleum ether (boiling range of 85° to 95° C.) for one-half hour. During this period the solution temperature rose from 20° C. to 45° C. Hydrogen chloride gas was bubbled through the reaction mixture for an additional 2.5 hours while the mixture was maintained at 76° C. The mixture was then cooled to −3° C. to precipitate a 3,3-dichloro-2-methylacrolein, di(p-tolyl) mercaptal product in a yield of 70 grams or 75 percent of theoretical. The latter, after recrystallization from purified petroleum ether (B.P. 70° C.), melted at 51°–52° C. The product had a chlorine content of 19.3 percent and a sulfur content of 17.7 percent. The theoretical values are 19.2 percent and 17.4 percent, respectively.

*Example 2.—3,3-dichloro-2-methylacrolein, bis(4-chlorophenyl)mercaptal*

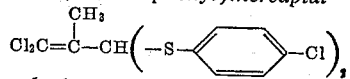

Anhydrous hydrogen chloride was bubbled through a solution of 25.8 grams (0.185 mole) of 3,3-dichloro-2-methylacrolein and 58.0 grams (0.40 mole) of 4-chlorothiophenol in 300 milliliters of petroleum ether (B.P. 85°–95° C.) for a period of 3 hours while the temperature was gradually increased to 76° C. The mixture was then cooled to precipitate a 3,3-dichloro-2-methylacrolein, bis(4-chlorophenyl)mercaptal product. The latter, after recrystallization from petroleum ether melted at 65°–67° C. The product was obtained in a yield of 60 grams or 75 percent of theoretical. The product had a chlorine content of 34.0 percent and a sulfur content of 15.5 percent. Theoretical values are 34.6 and 15.6 percent, respectively.

The compounds of the present invention have utility as insecticides. They are also useful as toxic constituents in germicidal and fungicidal compositions. The utility of the mercaptals as insecticides is illustrated by a representative operation wherein complete control of Mexican bean beetle (*Epilachna varivestis*) was obtained when aqueous compositions containing 0.24 pound of 3,3-dichloro-2-methylacrolein, bis(4-chlorophenyl)mercaptal per 100 gallons of ultimate mixture was applied to plant surfaces infested with the organism.

In another operation, the growth of *Fusarium oxysporum lycopersici* was substantially completely inhibited on rose bengale-streptomycin agar plates containing 10 parts per million of 3,3-dichloro-2-methylacrolein, di(p-tolyl)mercaptal.

The 3,3-dichloro-2-methylacrolein may be prepared by alkaline hydrolysis of 3,3,3-trichloro-2-methyl-1-propene to produce 3,3-dichloro-2-methyl allyl alcohol followed by the oxidation of the latter with nitric acid in the temperature range of from −3° C. to 10° C. and recovering the product by conventional methods.

We claim:

1. A mercaptal having the structure

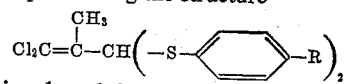

wherein R is selected from a member of the group consisting of methyl and chlorine.

2. 3,3-dichloro-2-methylacrolein, di(p-tolyl)mercaptal.
3. 3,3-dichloro-2-methylacrolein, bis(4 - chlorophenyl) mercaptal.

No references cited.